Oct. 6, 1953           G. E. SHAW           2,654,580
TEMPERATURE CONTROL OF AIR SUPPLY SYSTEMS
Filed June 22, 1950           2 Sheets-Sheet 1
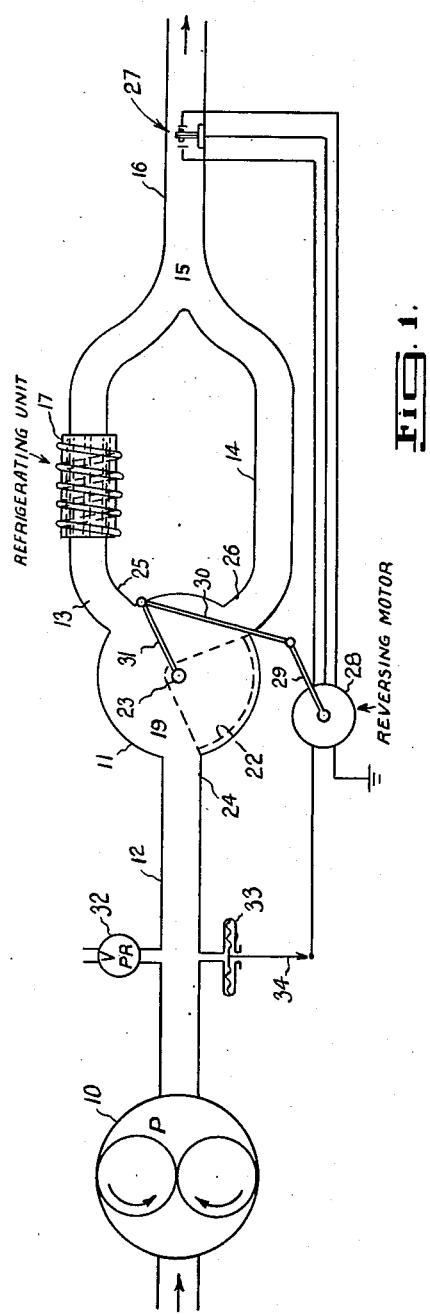
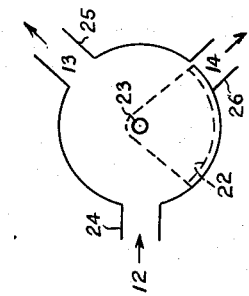
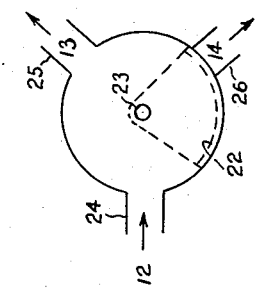
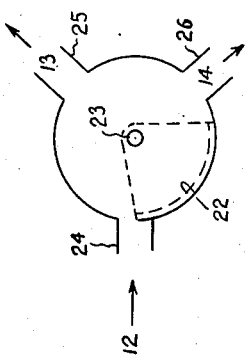
INVENTOR
G. E. SHAW
ATTY.

Oct. 6, 1953 G. E. SHAW 2,654,580
TEMPERATURE CONTROL OF AIR SUPPLY SYSTEMS
Filed June 22, 1950 2 Sheets-Sheet 2

INVENTOR
G. E. SHAW

ATTY.

Patented Oct. 6, 1953

2,654,580

UNITED STATES PATENT OFFICE 2,654,580

TEMPERATURE CONTROL OF AIR SUPPLY SYSTEMS

George Edward Shaw, Toronto, Ontario, Canada, assignor to A. V. Roe Canada Limited, Peel County, Ontario, Canada, a corporation Application June 22, 1950, Serial No. 169,738

6 Claims. (Cl. 257—3)

This invention relates to improvements to temperature regulating means for air supply systems for enclosed chambers, such as rooms or pressurized aircraft cabins and which embody a choke valve as a heating device.

In such systems air is customarily drawn from the atmosphere, fed through a blower and then passed through refrigerating or heating devices as required, diversion of the air through these devices being controlled by thermostatic means. The heating is effected indirectly by a choke valve which restricts the flow of air so that a back pressure is built up with an accompanying rise in temperature. Any cooling which may result due to the Joule-Thompson effect as the air expands in passing the choke valve will be negligible.

It is the object of this invention to provide means whereby the functions of the selector valve and the choke valve in such a system may be combined in a single device.

In the accompanying drawings which form a part of the specification and in which like reference characters designate like parts throughout the same:

Fig. 1 is a schematic view of an air temperature control system embodying a combined choke and selector valve.

Fig. 4 is a schematic view of the valve in a position to provide for heating of the air, Fig. 5 is a schematic view of the valve in a position to provide for cooling of the air, and Fig. 6 is a schematic view of the valve in a position to provide for cooling of only a portion of the air.

Figure 2:
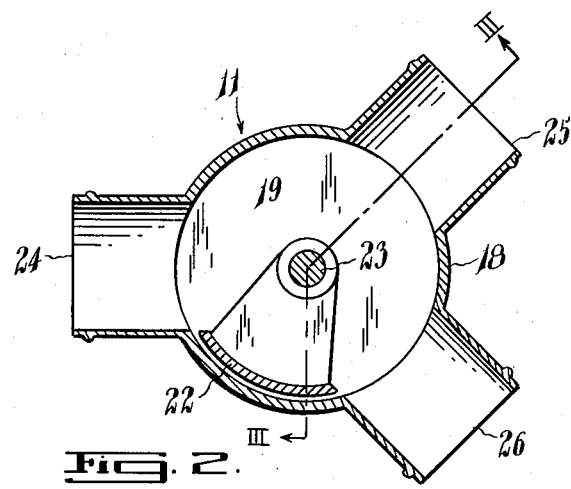
Fig. 2 is a sectional view of the valve showing the details of its construction.

It will be seen in Fig. 1 that the temperature control system comprises a compressor or blower 10, which is preferably a gear type blower, or which may be merely a bleed from an engine compressor. Blower 10 is driven by a motor or other convenient source of power (not shown) and connected to a combined selector and choke valve 11 by a conduit 12. A double conduit with arms 13 and 14 leads from the valve 11, the arms being confluent at a point 15 spaced from the valve to form a single outlet conduit 16. In the one arm 13 of the double conduit a refrigerating unit 17 is located and the other arm 14 therefore simply serves to by-pass this unit. For the purpose of this description conduits 12, 13 and 16 will be considered in combination to comprise the main air supply conduit and the arm 14 will be considered a by-pass conduit arranged in parallel with the main conduit although it will be clear that this is purely arbitrary, since with equal accuracy arm 13 might be considered a by-pass.

Figure 3:
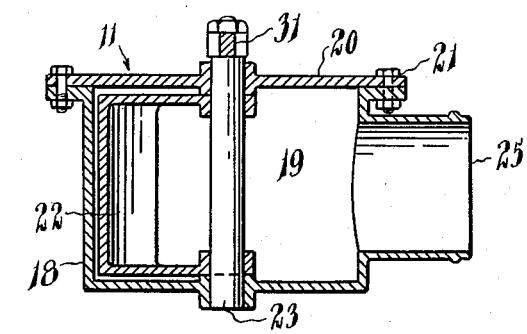
Fig. 3 is a sectional view on line III—III in Fig. 2.

The preferred construction of the valve 11 is shown in Figs. 2 and 3. The valve comprises a body 18 containing a cylindrical chamber 19 which is closed by a plate 20 fastened to the body by means of bolts 21. Within the chamber 19 a sector 22 (hereinafter referred to as the shutter 22, in accordance with standard engineering practice) is pivotally mounted on a spindle 23. The longitudinal axis of the spindle coincides with the longitudinal axis of the chamber, and the shutter 22 is formed substantially in the shape of the sector of a cylinder whose diameter is very slightly less than the diameter of the chamber 19. Inlet and outlet ports 24, 25 and 26 in the body 18 of the valve give access to the conduits 12, 13 and 14 respectively, the location and size of these ports in relation to the circumferential arc of the shutter 22 being such that the said arc is of a length sufficient to cover the ports 24 or 26 but less than the minimum distance between the two ports measured along the circumference of the chamber 19.

Air from the atmosphere enters the blower 10, where its pressure is raised, and then passes through the conduit 12 and into the valve 11; with the shutter 22 in the neutral position shown in Fig. 1 the air is permitted entry into the valve in an unrestricted flow. In this position the air will leave the valve by the arm 14 of the double conduit in preference to the alternate route through the other arm 13 because of the high resistance to the passage of air which is presented by the refrigerating unit 17 located in the said arm. As shown diagrammatically in Fig. 1 the refrigerating unit comprises longitudinal pipes in series with the main conduit 13 and wrapped with refrigerating coils. Since the total cross sectional area of the pipes is less than the cross sectional area of the conduit 13 on either side of the pipes, a resistance to the passage of air is created. Equivalent resistance can be created by baffles or by restricting the conduit in any convenient manner.

The valve is operated by a thermostatic control shown diagrammatically by way of example, in Fig. 1. A thermostatic switch 27 is mounted in the outlet conduit 16 downstream of the confluence 15 of the arms 13 and 14. This switch comprises a thermally responsive element which serves as a moveable contact which alternately engages two fixed contacts to complete a circuit to a reversing motor 28, to the shaft of which is connected an arm 29. The arm 29 is connected by link 30 to arm 31 secured to spindle 23 of the valve, so that rotation of the motor in one direction will rotate shutter 22 in the same direction and rotation of the motor in reverse direction will rotate the valve in that direction.

If the condition in which air enters the system is such that its temperature falls below a desired predetermined value by the time it has reached the outlet conduit 16, the thermostatic control will operate to counteract the temperature drop by causing the shutter 22 to rotate until it takes up the position indicated in Fig. 4. In this position the shutter partially closes the inlet port 24, instituting a choking action so that a back pressure is built up in the conduit 12 and the blower 10. Because of this back pressure a greater power input is demanded by the blower in order to maintain the volume of flow through the system, the resulting increased work which is done on the air appearing as an increase in temperature of the air leaving the blower. This air enters the valve chamber 19 through the partially covered port 24 and leaves by the port 26, choosing the path of least resistance through the lower arm 14 to the outlet conduit 16. Those skilled in the art will appreciate the fact that the amount of heating will be controlled by the degree to which the shutter covers the port 24 and that the thermostatic control operates continually to control the shutter's position in order that the temperature in the outlet conduit 16 may be brought to the predetermined value.

Should the temperature in the outlet rise above the predetermined value, the thermostatic control will again come into operation causing the shutter 22 to rotate until it takes up the position shown in Fig. 5 where it closes off the port 26. Direct access to the outlet by way of the lower arm 14 is thus prevented and the air is forced to leave the valve through the port 25, so that it passes through the upper arm 13 of the double conduit and the refrigerating unit 17 on its way to the outlet; in so doing it is cooled thereby. The degree of cooling which obtains will be regulated (through the agency of the thermostatic control) by the extent to which the port 26 is covered by the shutter 22. Fig. 6 shows the shutter in a position only partially covering the port 26 so that only a portion of the air which enters the valve is directed through the refrigerating unit, the remaining portion passing directly to the outlet conduit 16 by way of the lower arm 14. These two portions are mixed together in the outlet conduit at the point 15, giving a lesser degree of cooling than that which would result if the full flow of air were directed through the refrigerating unit.

A pressure relief valve 32 may be provided in conduit 12 to permit escape of air in the event that the system should become blocked to prevent damage to the compressor.

Supplementing relief valve 32, and set at a pressure slightly below the operative pressure of the relief valve is another pressure relief device, 33, diagrammatically illustrated in Fig. 1 by way of example, and comprising a diaphragm in a chamber connected to conduit 12. The diaphragm is connected to a moveable contact 34 in a supplementary control circuit to reversing motor 28 and is adjusted so that if pressure in conduit 12 exceeds a predetermined maximum the diaphragm will be depressed moving moveable contact 34 to close the circuit to actuate reversing motor 28 anti-clock-wise to move the shutter 22 away from port 24 to reduce back pressure on the blower 10.

This last described pressure relief device is useful when the system described is used for supplying air to pressurized cabins of aircraft. In such a case excessive pressure may occur when the aircraft is flying at low altitudes or when there is a very low external temperature, or, if the blower is geared to the engine, at high engine speeds. The pressure relief device serves to relieve such pressure by "backing off" the shutter as above described.

It will be understood that the form of the invention herewith shown and described is to be taken as a preferred example of the same and that various changes in the shape, size and arrangement of the parts may be resorted to without departing from the spirit of the invention or the scope of the subjoined claims.

What I claim as my invention is:

1. An air supply system comprising a compressor, a main conduit extending from the compressor to an outlet, a cooling element for cooling the air in said main conduit, a by-pass conduit by-passing the portion of the main conduit having the cooling element, the resistance to the flow of air offered by the by-pass conduit being substantially less than that offered by the by-passed portion of the main conduit whereby air will normally flow through the by-pass conduit, a combined selector and choke valve located in series in the main conduit intermediate the compressor and the cooling element, the said valve comprising a casing containing a chamber having an inlet port and an outlet port from and to the main conduit respectively and a second outlet port to the inlet end of the by-pass conduit, shutter means pivotally mounted in the chamber and adapted variably and alternately to obstruct the said inlet port and the said second outlet port, and means for selectively operating said shutter means.

2. An air supply system as claimed in claim 1 in which the means for selectively operating the shutter means includes a thermally responsive device in the main conduit down-stream beyond the outlet of the by-pass conduit.

3. An air supply system comprising a compressor, a main conduit extending from the compressor to an outlet, a cooling element for cooling air in the said conduit, a by-pass conduit by-passing the portion of the main conduit having the cooling element, the resistance to the flow of air offered by the said by-pass conduit being substantially less than that offered by the by-passed portion of the main conduit, a combined selector and choke valve located in series in the main conduit intermediate the compressor and the cooling element, the said valve communicating with the inlet of the by-pass conduit and comprising a casing containing a cylindrical chamber having an inlet port and an outlet port from and to the main conduit respectively and a second outlet port to the by-pass conduit, a shutter pivotally mounted on the axis of the said chamber and having substantially the form of a cylindrical sector the cylindrical surface of which is at least as great as the area of the second outlet port, the said shutter being adapted variably to cover the said inlet and second outlet ports, and means for operating the said shutter to vary selectively the degree to which the said shutter covers the said ports.

4. An air supply system as claimed in claim 3 in which the inlet port and the second outlet port are so situated in the chamber that the minimum circumferential distance between the said ports is greater than the circumferential length of the cylindrical surface of the shutter.

5. An air supply system comprising a compressor, a main conduit extending from the compressor to an outlet, a cooling element within the said conduit, a by-pass conduit having an inlet and being confluent with the main conduit intermediate the cooling element and the outlet, the resistance to the flow of air offered by the by-pass conduit being substantially less than that offered by the portion of the main conduit containing the cooling element, a combined selector and choke valve located in series in the main conduit intermediate the compressor and the cooling element, the said valve being connected to the inlet of the by-pass conduit and comprising a casing containing a cylindrical chamber communicating by an inlet port and an outlet port from and to the main conduit respectively and by a second outlet port to the inlet of the by-pass conduit, a shutter pivotally mounted on the axis of the said chamber and having substantially the form of a cylindrical sector the cylindrical surface of which is at least as great as the area of the second outlet port, the said inlet port and second outlet port being so situated in the chamber that the minimum circumferential distance between the said ports is greater than the circumferential length of the cylindrical surface of the shutter, the said shutter being adapted variably to cover the said ports, and thermostatically operated means including a thermally responsive means intermediate the confluence of the conduits and the outlet for operating the said shutter to vary selectively the degree to which the said shutter covers the said ports.

6. An air supply system comprising a compressor, a main conduit extending from the compressor to an outlet, a cooling element for cooling the air in said main conduit, a by-pass conduit by-passing the portion of the main conduit having the cooling element, a combined selector and choke valve located in series in the main conduit intermediate the compressor and the cooling element, the valve comprising a casing containing a chamber having an inlet port and an outlet port from and to the main conduit respectively and a second outlet port to the inlet end of the by-pass conduit, shutter means pivotally mounted in the chamber and adapted variably to obstruct the inlet port thus obstructing the flow of air from the compressor into the valve, the shutter means also being adapted variably to obstruct at least one of the outlet ports thus variably controlling the flow of air from the valve to the by-passed portion of the main conduit, and means for selectively operating said control means.

GEORGE EDWARD SHAW.

References Cited in the file of this patent

UNITED STATES PATENTS

| Number | Name | Date |
|---|---|---|
| 825,706 | Dyblie | July 10, 1906 |
| 2,063,477 | Young et al. | Dec. 8, 1936 |
| 2,401,861 | Cunningham | June 11, 1946 |
| 2,412,071 | Warner | Dec. 3, 1946 |
| 2,459,000 | Morris | Jan. 11, 1949 |
| 2,474,441 | Sparrow | June 28, 1949 |
| 2,507,044 | Palmatier | May 9, 1950 |
| 2,509,899 | Wood et al. | May 30, 1950 |
| 2,562,918 | Hynes | Aug. 7, 1951 |